J. D. PEDERSEN.
FIREARM.
APPLICATION FILED APR. 28, 1917.
1,355,417.
Patented Oct. 12, 1920.
6 SHEETS—SHEET 6.
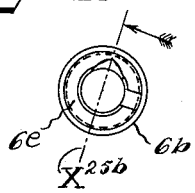
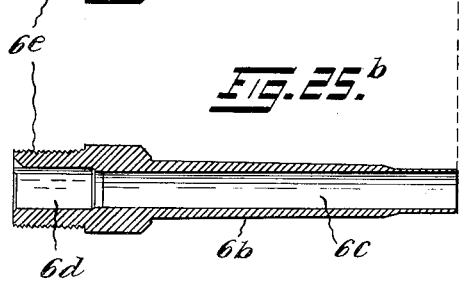
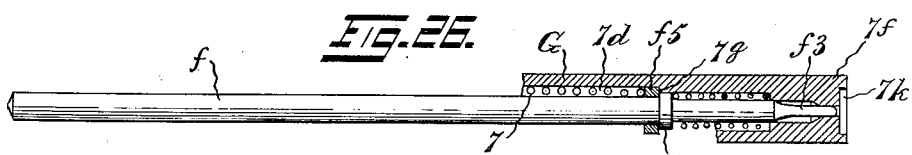
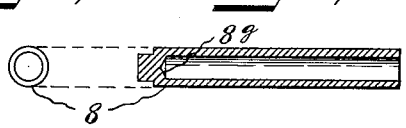
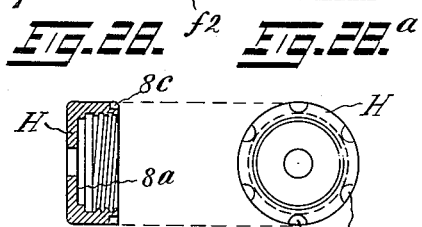
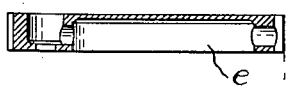
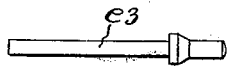
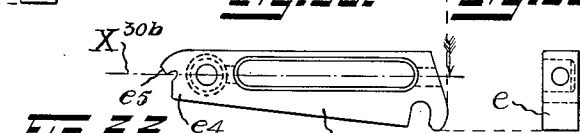
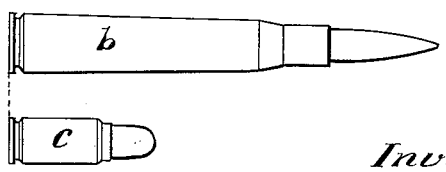
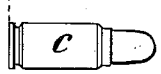
Inventor:
John D. Pedersen.
By his Att'y, F. H. Richards.

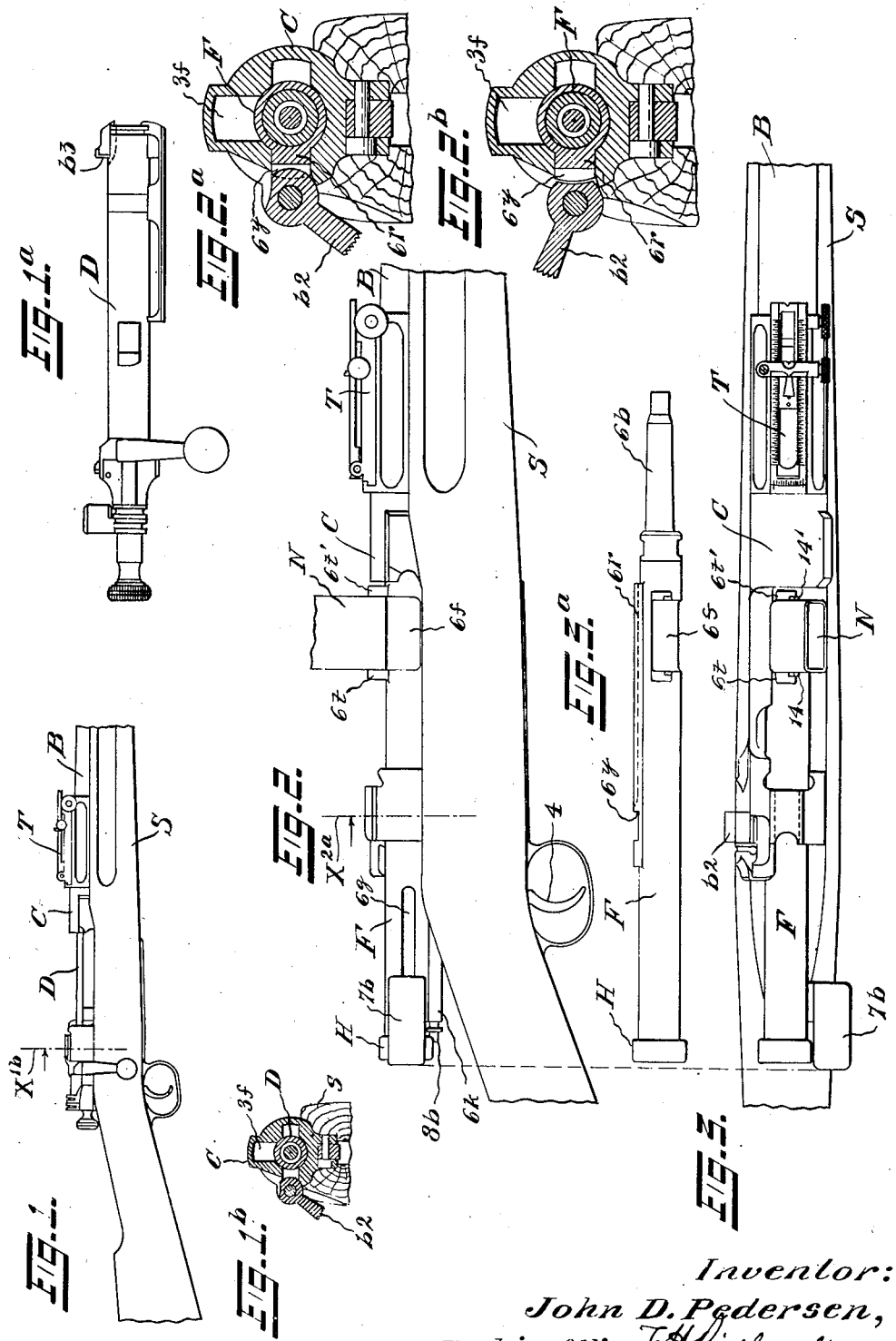

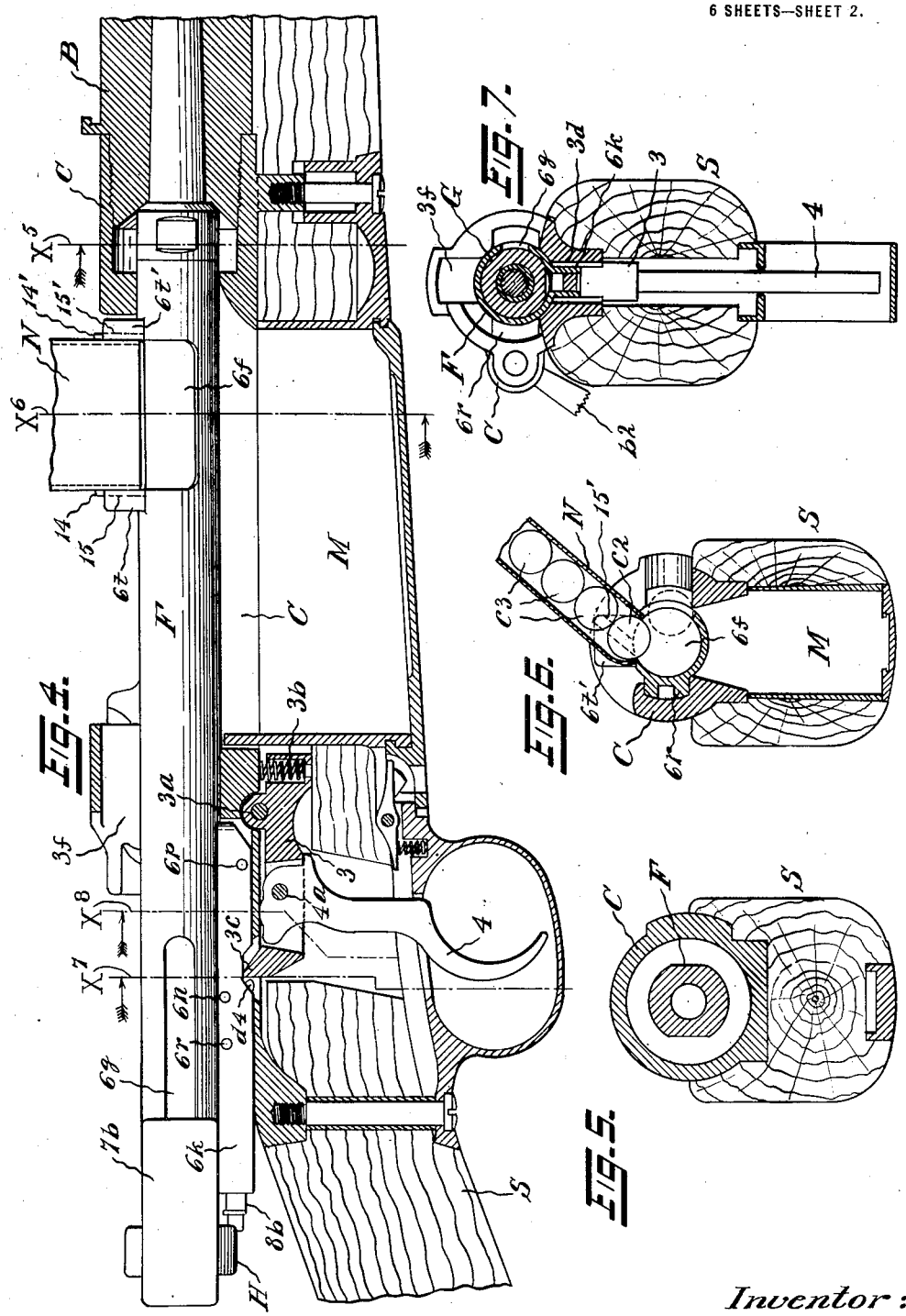

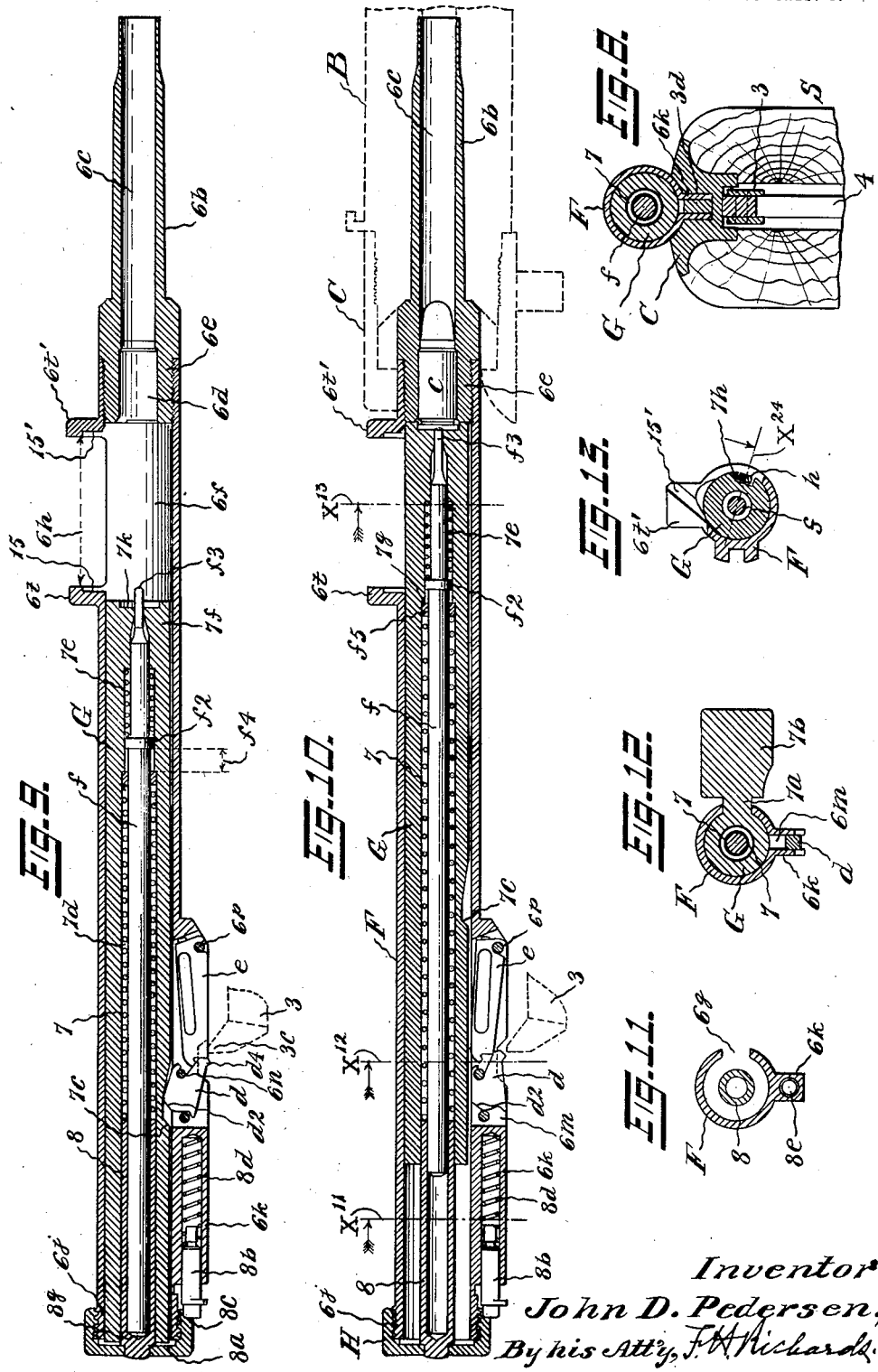

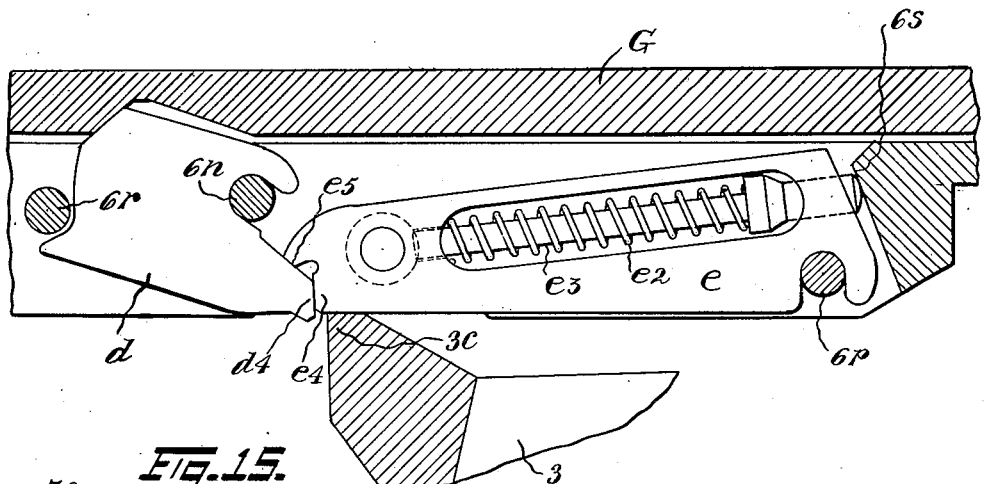
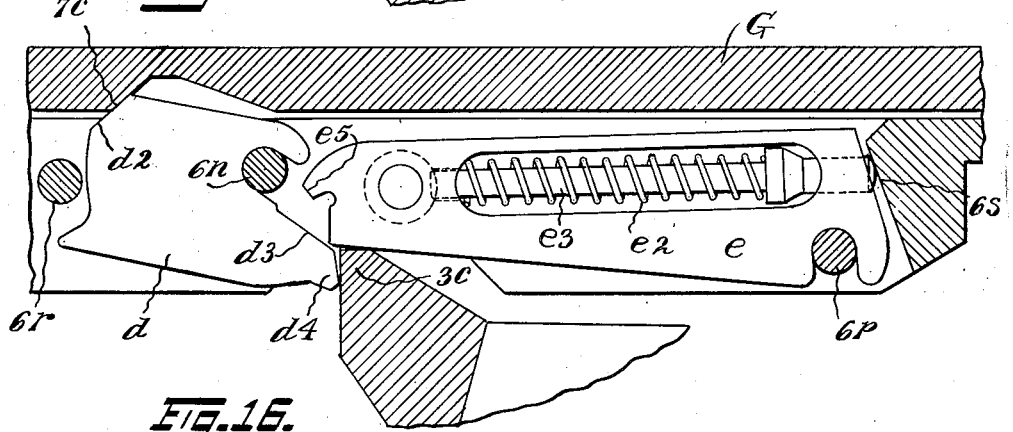
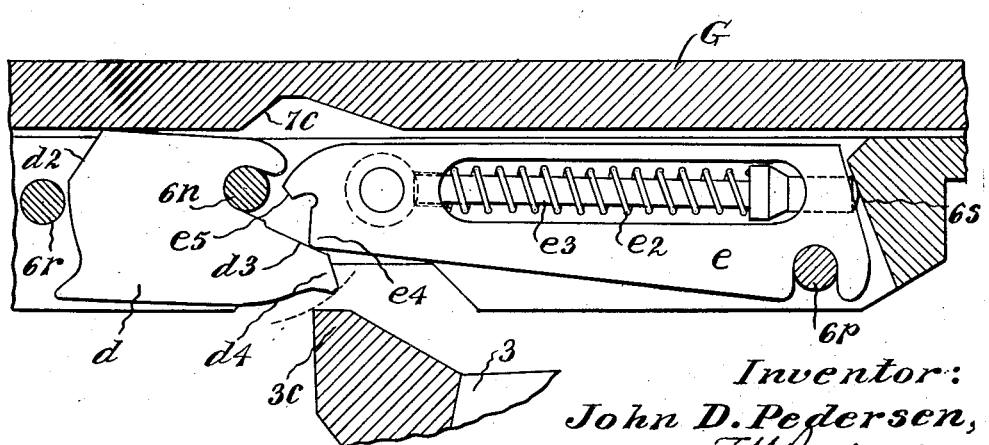

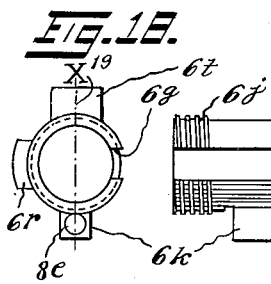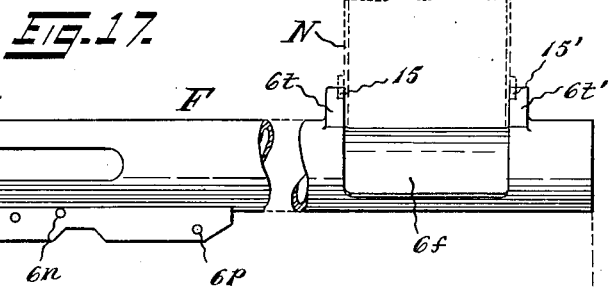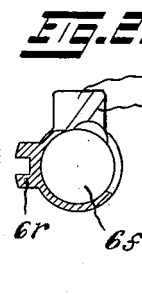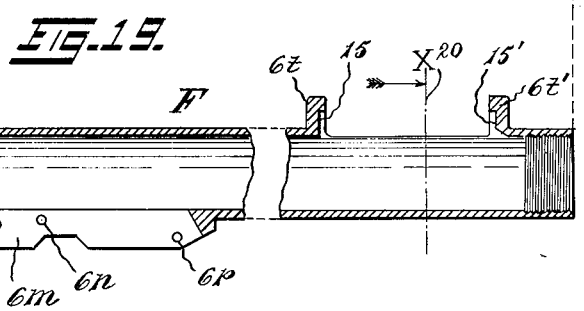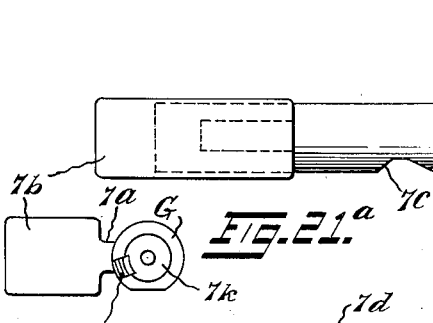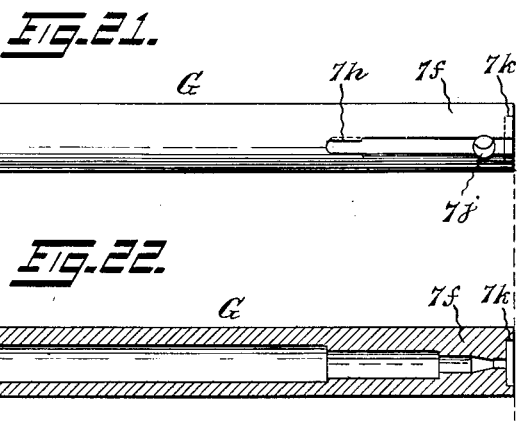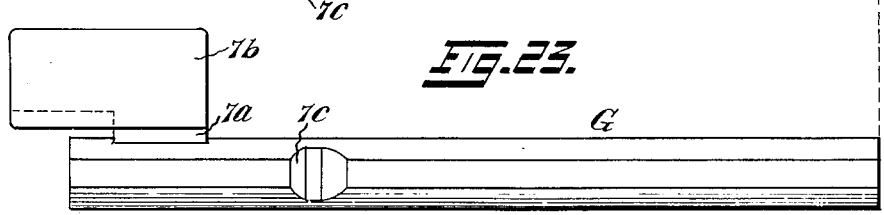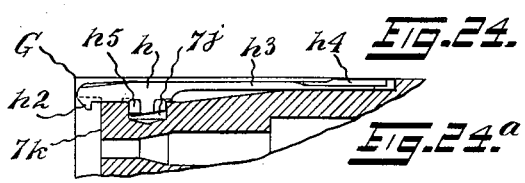

UNITED STATES PATENT OFFICE.

JOHN D. PEDERSEN, OF JACKSON, WYOMING.

FIREARM.

1,355,417.   Specification of Letters Patent.   Patented Oct. 12, 1920.

Application filed April 28, 1917. Serial No. 165,171.

*To all whom it may concern:*

Be it known that I, JOHN D. PEDERSEN, a citizen of the United States, residing in Jackson, in the county of Lincoln and State of Wyoming, have invented certain new and useful Improvements in Firearms, of which the following is a specification.

This invention relates to breech-loading firearms, and more particularly to improvements adapted for use in that class of shoulder arms which are commonly known as bolt-guns; some features, however, are applicable to firearms of other varieties, as will more clearly appear from the following description.

One of the principal objects of my present invention is to provide a secondary firearm mechanism which is in the nature of an auxiliary arm, and which shall be applicable—by suitable adaptation merely of the form and proportions thereof,—to ordinary kinds of breech-loading guns, and thereby equip such firearms for operation, at the election of the user, in either one of two ways. For instance, the primary arm may be an ordinary bolt-gun, of which the "Springfield" service rifle is one well-known kind or type. This class of firearms usually have the barrel thereof secured to or in the forward end of a frame, or "receiver," in which is formed a breeching-member chamber, and the breeching-member is commonly a reciprocatable "bolt,"—or (in some cases) a "breech-block,"—arranged to be readily and quickly removable from the frame. Taking such a firearm for use as a primary arm, and the breeching-member, or "bolt" thereof being removed, the secondary or auxiliary firearm mechanism may then be inserted and removably fixed in working position, in place of the removed breeching-member, and thus make the combined or augmented firearm ready for use.

A further object is to furnish means whereby to temporarily, and from time to time, equip a breech-loading shoulder arm,—especially such a firearm of the so called "military" class,—with means for firing with a relatively great rapidity, a short range ammunition in place of the long range and high-power cartridges usually employed in operating such breech-loaders. These long range cartridges are necessarily of such dimensions and considerable weight, that in actual service a soldier can carry only a small number of them, whereas he can carry a relatively very large number of shorter and lighter cartridges which are especially suitable for short range work, as for instance, in stopping a charge, or "rush," from a near-by trench. For these purposes, the so called "stopping" effect" of a short projectile of a given diameter, even when fired at a relatively low velocity, is known to be substantially equal to the heavier projectiles which are of the same diameter, but of the usual "piercing" form, as now usually employed in the regulation service ammunition for military shoulder arms. Therefore, certain features of my present improvements relate more especially to the secondary firearm mechanism, which, to secure rapidity of action, is preferably organized for operating by the auto-loading method, and which, for such reasons, is herein shown provided with a cartridge-actuated, combined breech-bolt and power-slide that is coöperative with other devices in an apparatus comprising cartridge-operating and shell-ejection means.

By equipping and employing in the manner herein set forth, a bolt-gun of the class indicated, a further object and advantage is secured, in that the firearm may be fired rapidly to the extent of several hundred cartridges without such an excessive heating as to disable the firearm. If the regulation long-range cartridges should be fired rapidly in such a shoulder arm,—as for instance, with the rapidity common in auto-loading pistols and in machine guns,—the firing of some fifty to eighty cartridges would ordinarily so overheat the arm as to render the same incapable of effective use. Therefore, as a means whereby to obtain the desired rapidity and duration of continuous firing for the short-range work, the insertible auxiliary mechanism should not only be a magazine breech-loader, but is preferably constructed for using cartridges which are very much shorter, and which have much smaller charges of explosives, than the said long range cartridges, so that much less heat will be generated within the barrel in proportion to the number of cartridges used in a given time. By the same means, a more rapid cooling is also secured, since the gas pressures are much less while using the short-range cartridges, and also because both the heat-absorbing and the heat-radiating surfaces of the barrel are much larger relatively to the powder charges of the short range ammunition, than they are relatively to the charges of the long range ammunition.

While the cartridges for use in the auxiliary mechanism should, in accordance with the best practice, be very much shorter than the regular high-power cartridges for the primary arm, it will be convenient and desirable in many instances to have the respective projectiles of about the same diameter, so that the shorter ones will work properly in the barrel of the shoulder arm. This difference in the lengths of the respective kinds of cartridges favors the arranging of the proportions and details of the said secondary mechanism in such manner as to require only a short reciprocation or stroke of the breech-bolt member of this mechanism, so that this entire mechanism may, in practice, be so designed and constructed as to be for nearly the whole length thereof, contained within the space otherwise occupied by the relatively long-stroke bolt-member of the primary arm.

In addition to the foregoing objects and features of a more general character, further objects and advantages of importance are pointed out and explained in the course of the following detailed description of a preferred embodiment of my present improvements.

In the accompanying drawings, forming a part of this specification, Figure 1 is a side elevation (drawn on a small scale,) of the middle portion of a breech-loading shoulder arm of the well-known "Springfield" type, and having in place in the frame,—and in closed, or "firing" position,—the bolt-member of the firearm mechanism; this regular bolt-member,—here designated as a whole by D,—is shown in a similar side view, but removed from the mechanism, and on a larger scale, in Fig. 1$^a$.

Fig. 1$^b$ is a section on line X$^{1b}$, Fig. 1, for showing the relation of the usual form of locking and releasing device, $b^2$, of a "Springfield" rifle, to the bolt mechanism, D, thereof; this view, Fig. 1$^b$, is also for comparison with Figs. 2$^a$ and 2$^b$, hereinafter described.

Fig. 2 is a side view similar to Fig. 1, but showing the shoulder arm provided with the auxiliary or secondary firearm mechanism, the frame or casing, F, of which is inserted into the main frame, or "receiver," C, and thus for nearly the whole length thereof is contained within the breeching-member chamber or space otherwise (as in Fig. 1) occupied by the regular bolt-member, as D, Fig. 1$^a$.

Figs. 2$^a$ and 2$^b$ are similar sectional views on line X$^{2a}$ of Figs. 2 and 3 for showing two positions, respectively, of said locking device $b^2$ of the primary arm, whereby this device, $b^2$, when in one position, Fig. 2$^a$, engages and thus holds in place the frame, F, of the secondary mechanism, and when in another position, Fig. 2$^b$, releases said member F, and thus permits the secondary mechanism to be withdrawn,—bodily and without disassembling of any parts thereof,—from the primary arm; these views, Figs. 2$^a$, 2$^b$, are drawn on an enlarged scale corresponding to Figs. 4 to 10, inclusive.

Fig. 3 is a plan view of the mechanism shown in Fig. 2; these two views are drawn in alinement to facilitate comparison of the same. In Figs. 1, 2 and 3, the rear sight T, is shown of a form and arrangement as commonly employed on the "Springfield rifle," and hence it need not be described in detail; this sight is shown herein in the folded-down position thereof.

Fig. 3$^a$ is a plan view of said frame member F, of the said secondary, or auxiliary, mechanism; this view is on the same scale as, and is located alongside of, Fig. 3, for showing some features of said frame member which, in Fig. 3, are hidden by being inclosed within the receiver C of the primary arm.

Fig. 4 is a sectional side view, corresponding with Fig. 2, but drawn on a larger scale,—and with end portions broken away,—for illustrating the preferred general arrangement of the primary arm and auxiliary or secondary arm, (the latter being shown as a magazine breech-loading bolt-gun), when these arms are assembled together ready for use in firing the short range ammunition; in this view the details of the mechanism are indicated as being in firing position.

Figs. 5, 6, 7 and 8 are cross sectional views taken on the line X$^5$, X$^6$, X$^7$ and X$^8$, respectively, of Fig. 4, and are each taken as if looking in a forward direction, as indicated by the arrows adjacent to said section lines.

Fig. 9 is a sectional side view of the secondary firearm mechanism,—corresponding with Fig. 4,—for more fully illustrating the details and mode of operation of the mechanism; in this view the breech-bolt is in retracted position and the mechanism ready for firing.

Fig. 10 is a sectional side view similar to Fig. 9, for showing the same parts in a more advanced stage of their cycle of operation, the breech-bolt being shown in forward position, as at the moment of firing the cartridge.

Figs. 11, 12 and 13 are cross-sectional views in lines X$^{11}$, X$^{12}$, X$^{13}$, respectively, of Fig. 10, the direction of the line of sight being indicated by the arrows adjacent to such section lines, respectively.

Figs. 14, 15 and 16 are three enlarged detail views (similar to portions of Figs. 9 and 10) for illustrating the step by step operation of the trigger-and-sear mechanism in connection with the combined breech-bolt and power slide.

Fig. 17 is a side elevation of the frame or "casing" member of the secondary firearm mechanism, as seen from the right-hand in Figs. 6, 7 and 8; said member is here shown shortened (for convenience of illustration) by having a mid-portion thereof broken away; this casing, or secondary frame,—which is designated as a whole by F,—may also be designated as the "receiver," when referring to the said secondary mechanism.

Fig. 18 is an end elevation of the casing member or receiver F, as seen from the left-hand in Fig. 17; Fig. 19 is a longitudinal section, (shortened as in Fig. 17), taken on line $X^{19}$, Fig. 18; and, Fig. 20 is a cross-sectional view of the member F taken on line $X^{20}$, Fig. 19. The position of the frame F in Figs. 17 and 19 corresponds with the position thereof as seen in Figs. 2, 4, 9, and 10.

Fig. 21 is a side elevation of the combined breech-bolt and power slide, (with the extractor removed therefrom), as seen from below in Fig. 3, and from the right-hand in Figs. 7, 8, 12 and 13; Fig. $21^a$ is a front end elevation as seen from the right-hand in Fig. 21, and showing the extractor in place in the recess which is shown formed therefor in said breech-bolt member; Fig. 22 is a longitudinal vertical section through this bolt or slide member, and Fig. 23 is an underside view thereof, as seen from below in Figs. 2, 4, 7, 8, 9, 10, 12 and 13.

Fig. 24 is a side view on an enlarged scale, of the extractor, (in a preferred form thereof), as seen from above in Fig. $21^a$, and showing the relation thereof to the bolt member as seen from above the line $X^{24}$ in Fig. 13; Fig. $24^a$ is a view of said extractor as seen from below in Fig. 24.

Fig. 25 is a side view of the barrel of the secondary mechanism, and which is here shown in a position corresponding to the position thereof as shown in Figs. 4, 9 and 10; Fig. $25^a$ is an end elevation of said barrel as seen from the left hand in Fig. 25; and, Fig. $25^b$ is a longitudinal section in line $X^{25b}$, of Fig. $25^a$.

Fig. 26 is a side view of the firing-pin,—also similarly shown in Figs. 9 and 10,—which is also utilized as an ejector device.

Figs. 27 and $27^a$ are, respectively, a longitudinal section and rear-end view of the guide tube for the rearward end of the firing-pin; this guide tube also serves as an abutment for the firing-pin spring,—see Figs. 9, 10.

Figs. 28 and $28^a$ are, respectively, a section and end view of the casing cap; this member when in place on the casing, F,— as in Figs. 2, 3, 9, 10,—holds in place the operative parts assembled therein.

Figs. 29 and $29^a$ are, respectively, a side view and end elevation of the sear; Figs. 30, $30^a$ and $30^b$ are detail views of the sear lock, and are respectively, a side view, and end view, and a horizontal section in line $X^{30b}$; these five views, it will be noted, are drawn on a scale twice as large as shown in Figs. 9, 10, and one-half the scale of Figs. 14, 15 and 16.

Fig. 31 is a side view of the guide rod for the sear-lock spring,—see Figs. 14 to 16,—and Fig. 32 is a similar view of the cap lock,—see Figs. 9, 10.

Fig. 33 is an approximate illustration of the relative proportions of two kinds of cartridges such as may be used in the primary arm and in the secondary firearm mechanism, respectively, when these are of particular construction and arrangement herein represented.

Similar characters designate like parts in all the figures.

While my present improvements are applicable to a variety of shoulder arms, the well-known kind of bolt-gun represented in Fig. 1,—commonly referred to as the "Springfield" rifle,—is typical of a considerable number of such arms, and has therefore been selected for illustration herein as a suitable "primary firearm" to which my improved secondary firearm mechanism may be advantageously applied for operating in combination therewith. It will be remembered that, as indicated in Fig. 1, said "Springfield" rifle,—which, of course, is a military arm,—comprises the barrel B; the "receiver" or main frame, C, having therein a breeching-member chamber; the reciprocatable breech-bolt D, operable in said chamber; and, the stock S, having the usual fore-stock and the shoulder portions, (not herein fully shown). The barrel B also carries the usual, or some suitable sights, as the rear sight T and a fore sight (not shown). The stock, frame and barrel are held assembled by the customary releasable fastenings,—which do not require particular description here,—and an ordinary magazine is indicated at M from which to supply the regulation service cartridges through the usual bottom opening of the frame C to the required position forward of the breech-bolt D, (when this is retracted), all in a well-known manner. Said magazine M is herein indicated in Figs. 4 and 6, but the spring and follower usually arranged therein are here omitted, since those parts are not only well-known, but when in place are not operable in connection with my present improvements. In this connection, it should be understood that the parts illustrated in Figs. 1, $1^a$ and $1^b$, being already disclosed and explained in printed publications, need not be fully described or illustrated herein, nor explained further than is required for the purposes of comparison with the succeeding views.

One of the leading purposes of this invention being to provide for using any breech-loading shoulder arm suitable therefor,—especially a bolt-gun of the said "Springfield" type,—with two kinds of ammunition, (Fig. 33), and also to enable the user to quickly change from either one to the other, as occasion may require; therefore, the frame, as F, (see Figs. 2, 3, $3^a$, 4), of the secondary mechanism, is herein shown having the forward part thereof of a bolt-form, and it should have such an external size and suitable conformation as to provide for sliding this frame forwardly into the working position within the receiver or main frame, as C, after the bolt member, as D, of the primary firearm mechanism has been withdrawn out of the breeching-member-chamber of said receiver. When thus removably inserted and locked in place, (Figs. 4, 9, 10,) said secondary frame F, as will now be evident, constitutes a breeching-member for the barrel B of the primary arm. Also, since a considerable part of the secondary barrel, $6^b$, is inclosed within the main barrel B, said short barrel $6^b$ may be made with thin walls and hence of light weight. Similarly, since the secondary frame F may be partially inclosed,—in accordance with the arrangement thereof herein selected for illustration,—in the main frame, as C, of a primary arm, therefore said secondary frame may be made of a minimum size, and the entire secondary arm may be made of a minimum weight, much less, in practice, than would otherwise be practicable, even in a firearm of the pistol class if constructed for using ammunition of the same size and power.

By comparing the representation in Fig. 33, of the long range cartridge, $b$, with the short barrel $6^b$ of the secondary mechanism as shown in Figs. 9 and 10, it will be seen that this barrel and said high-power cartridge $b$ are externally of corresponding sizes and proportions, so that the auxiliary barrel $6^b$ will closely fill the usual cartridge chamber of the barrel of the primary arm. (See Figs. 4, 10.) Thus, it may be said that a forward part or extension of the frame F of the secondary arm, forms, also,—or has therein,—a rearward extension of the main barrel B; also, that the short bore $6^c$ connects and is in alinement with the bore of the main barrel B, and with the cartridge chamber $6^d$ (see Fig. 9), of the secondary mechanism. Said forward extension, $6^b$, therefore, in one sense, constitutes an "adapter," while it also constitutes a short barrel for the secondary arm, so that said extension $6^b$ serves as a combined adapter and barrel-extension for the primary arm while serving as the barrel of the secondary arm.

In practice, said secondary barrel $6^b$ may be made as a separate piece and removably-fixed in the forward ends of the secondary frame F, or, in some instances, if preferred, said short barrel may be made integral with said frame. However, the said separate construction, arranged about as herein illustrated, is believed to be generally preferable, and accordingly said barrel $6^b$ is shown provided with a threaded end $6^e$ screwed into the frame F similarly as the main barrel B is fixed to the receiver C.

The insertible frame F has said cartridge-chamber $6^d$ thereof extended rearwardly and enlarged to form a breech-bolt chamber, $6^f$, in which the bolt G is reciprocatable, forwardly by the power-spring 7, and rearwardly,—when a cartridge is fired,—by cartridge actuation. The bolt G is shown provided with an arm or projection, $7^a$, which extends through the frame-slot $6^g$ (see Figs. 11, 12) and there carries a weight $7^b$ which also serves as a handle whereby the bolt may be retracted by hand for engaging the retaining face $7^c$, (Fig. 14) rearwardly of the sear-face, as $d^2$, formed on some suitable sear-device. Thus the arm $7^a$ is a means for preventing the bolt G from turning (partially rotating) within the frame F.

When the bolt G is retracted either by hand or cartridge actuation, to the loading position, Fig. 9, the forward end, $7^f$, of the reciprocatable bolt comes rearwardly of the opening $6^h$ in the frame, (Fig. 9), so that a cartridge of the series $c^3$, as $c^2$ (Fig. 6) will be lowered or drop down in the magazine N and stand partially forward of the bolt G, and thus on the release of the bolt, will be pushed forward,—or "placed,"—into firing position as shown in Fig. 10. During this forward movement,—which in practice, will be rapidly completed by said spring 7,—the relatively heavy firing-pin $f$ lies loosely and in a fully-retracted position in the bore $7^d$ of the bolt G, and will at first be held back by its own inertia and the light spring $7^e$, with the collar $f^2$ of said pin resting against the shoulder at $7^g$ in the breech-bolt. On the bolt G stopping suddenly at the end of its forward stroke (Fig. 10), the momentum of the firing pin $f$ compresses said pin-retracting spring $7^e$ and thus the point $f^3$ of the pin is driven against the primer and fires the cartridge in a manner already well-known in the art.

Said fully-retracted position of the pin $f$ in the bolt G is not shown in Figs. 9 and 10, but is indicated in Fig. 26; it occurs after the bolt G moves forward in the frame F by the distance $f^4$ in Fig. 9; then said collar $f^2$ rests against the ring or stop $f^5$ which is held forwardly in the bore $7^d$ by the spring 7, and thus bears against a shoulder at $7^g$. For illustrating these features, a fragmentary part of the bolt G is shown in section in Fig. 26, in the position above explained.

The mechanism or bolt chamber $6^f$ of the frame F of the auxiliary mechanism, is shown extended to the rear end of this frame, so that the operative members may be readily assembled therein and removed therefrom. A suitable cap, as H, may be removably fixed on the frame F, in any convenient manner, for closing the rearward end of said chamber $6^f$, and also to furnish a support for the abutment tube 8, and also an abutment face at $8^a$, (Fig. 9) for stopping the rearward movement of the bolt G. Similarly the retraction of the firing pin in the bolt is stopped by the end, $8^b$, of the tube 8 before the bolt G has been fully retracted. Since said cap H serves as a stop or abutment face for limiting the rearward stroke of the breech-bolt G, it may be said to constitute an adjustable stroke-limiting stop for the breech action. In the present instance, said cap H is shown strongly attached by being screwed onto the threaded rear-end portion $6^j$ (Fig. 9) of the frame F, and is locked in place by a spring-actuated retractable pin or detent, $8^b$, engaging in notches, as $8^c$, formed in the periphery of the cap. By this means, said cap may be screwed onto the frame a greater or lesser distance, and so be locked in a selected position, as may be required for effecting a slight adjustment of the precise working position of the breech-bolt G and firing pin $f$.

When the frame F is slid into place in the receiver C, said rib-like lower portion $6^k$ (see Figs. 4, 7, 8) is contained within a groove or channel, $3^d$, in the main frame C. In said portion $6^k$, the mortise $6^m$ constitutes a chamber space for receiving the sear-device, which in the form thereof herein shown consists of the two coacting members $d$ and $e$, these being designated as the sear and the sear-lock, respectively. The sear $d$ is operated on its pivot $6^n$ into the bolt-engaging position thereof, (Figs. 9 and 14), by some directly-acting spring (not shown) to be suitably arranged therefor. In the present instance, however, said sear-actuation is effected by the sear-lock-actuating spring acting through a sear-lock member, $e$, which is also appurtenant to the breech-loading auxiliary arm. (See Figs. 14, 15, 16.) The spring $e^2$ is or may be carried on a guide rod, $e^3$, slidably mounted in the lock member, $e$, and bearing against the frame face $6^s$, which thus serves as an abutment.

The sear-lock $e$ being pivoted on the pivot or pin $6^p$, the spring $e^2$ therefore tends to continuously force down the sear-engaging end $e^4$, which thus bears on the face $d^3$ of the retracted sear, (Fig. 16), for thereby turning the sear to the position thereof in Fig. 14; this stroke of $d$ is limited by a stop, as $6^r$. When this operation takes place, the lock-end $e^4$ comes forward of the face $d^4$ of the sear $d$, thereby blocking (or "locking") the sear in the slide-engaging position thereof (Fig. 14) until the lock $e$ shall be raised to the position thereof shown in Fig. 15; when thus released, however, the lock $e$ (unless otherwise controlled) will be quickly raised to its position in Fig. 16, by a rotation of sear $d$, since the faces $7^c$ and $d^2$ are,—in the preferable form herein shown,—so inclined or shaped as to operate as a sear retracting means, whereby the sear $d$ will be actuated (toward its slide-releasing position in Fig. 16) by the forwardly acting pressure of bolt or slide G. For limiting the downward movement of the lock $e$, this may be provided with any suitable stopping means, such, for instance, as the stop-face $e^5$ which strikes the face $d^3$ when the parts are in the positions shown in Fig. 14.

For controlling the operation of the sear $d$ notwithstanding the above described mode of coaction thereof with the lock-member $e$, I have provided a further improvement, as follows. It will be remembered that the main trigger, 4, of the primary arm is pivoted at $4^a$ (see Fig. 4) for operating in a well-known manner the main sear-lever 3, which is shown pivoted at $3^a$ to the receiver or frame C, and is strongly actuated by the usual spring $3^b$. The point $3^c$ is thus normally kept raised up to its position in Figs. 4 and 15, and is thus in position when the ordinary bolt D, (Figs. 1, $1^a$), is in use, to catch and hold retracted the usual firing pin thereof, all in a well-known manner. In order to secure certain advantages by the employment of said lever 3 in connection with the secondary firearm mechanism, the sear $d$ and sear-lock $e$ may be so located, arranged and connected in or appurtenant to the frame F as to bring each of said members $d$ and $e$ into a direct coaction with said lever point $3^c$; by this means,—as illustrated in the drawings,—I secure a peculiar, and in some respects a relatively automatic mode of operation of the combined firearm.

When the combined arm is assembled ready for use, the gunner with one hand grasps the arm and draws back the trigger 4, (this being appurtenant to the primary arm or bolt-gun), and with the other hand grasps the handle $7^b$ and draws back the bolt G as indicated in Figs. 4, 9, 14; during this operation, the lever point $3^c$ is retracted as indicated in Figs. 9, 10, 14 and 16, so that the lock $e$ and sear $d$ can take their positions as in Figs. 9 and 14, in the manner already explained, thereby locking the bolt G in its retracting or "firing" position as in Fig. 9. This having been accomplished, on releasing the trigger 4, the relatively powerful spring 3ᵇ (Fig. 4) forces the lever-point 3ᶜ upwardly and thereby raises locker $e$ to its position in Fig. 15, (also indicated in Fig. 4), and thereby permits the sear $d$ to turn slightly downward (Fig. 15), until stopped by its point or arm $d^4$ coming against said main lever 3, as in Figs. 4 and 15. The arm is now cocked ready for the automatic action. Then, to fire the arm, it is only necessary to again draw back the trigger 4 in the usual manner, thereby retracting the lever-point 3ᶜ from the position thereof in Figs. 4 and 15 to the position thereof in Figs. 9, 10 and 16, whereupon the bolt G slides forward, the sear $d$ is blocked in lowered position as in Figs. 10 and 16, the cartridge, as $c$, is loaded into the barrel and fired, and the bolt G is next driven back to and locked in its position in Figs. 4, 9 and 14. Thus the required automatic loading and firing operations are completed.

On account of the extreme rapidity with which the said operations are performed, the trigger 4 when it is pulled in order to fire the arm, will normally hold the lever point 3ᶜ depressed as in Figs. 9 and 14 until after the full retraction of the bolt G; this provides for the parts $d$ and $e$ to thereupon immediately assume their position as shown in Fig. 14, so that on releasing the trigger 4, said parts will take their positions as in Fig. 15, in the manner already explained. Thus the auxiliary arm each time it is fired, is automatically set and made ready to be fired again by the next backward pull upon the trigger 4; this trigger is appurtenant to the primary arm or bolt-gun, while the sear $d$ is appurtenant to the frame F, and, hence, also appurtenant to the auxiliary firearm mechanism.

On the firing of the cartridge, the shell thereof, as $c$, Fig. 10, is driven back against the bolt G, which by reason of its own weight and the force of the power spring 7 affords sufficient resistance to permit the projectile to pass through and out of the barrel while the bolt itself moves but slightly during the time in which the bolt is absorbing power enough to later complete by its own momentum, the rearward stroke to the position thereof in Fig. 9. During this rearward stroke, the bolt-advancing spring 7,—by its bearing against the tube 8,—is compressed and thus made ready for again driving forward the bolt when the sear, $d$, shall be again retracted to the point of disengagement. On nearing its said rearward position, (Fig. 9) the rearward end of the firing pin strikes against the end of tube 8 (which is held by the cap H), and thus the point $f^3$ of said pin is driven forwardly to a considerable distance beyond the face, or shell seat 7ᶠ, (Fig. 9), and thereby said point acts as an ejector for the shell of the spent cartridge.

In this operation, however, the point $f^3$ coöperates with an extractor hook, $h^2$, with which the breech-bolt will be provided in some suitable or well-known manner. In the present instance, said hook $h^2$ is shown formed on the forward end of the extractor $h$, which is carried by the spring-arm $h^3$ thereof engaging with the bolt G by means of interengaging faces at $h^4$ and 7ʰ,—see Figs. 21 and 24; but any suitable and well-known arrangement of extractor device may be employed. For sustaining the pull upon the hook $h^2$, while drawing the cartridge shell from the barrel 6ᵇ, (compare Figs. 10, 21, 21ᵃ, 24), said extractor $h$ may be provided with a short projection, as $h^5$, fitted to engage in the socket 7ʲ, (Fig. 21), of the bolt G.

Since the primary arm, (Fig. 1), is organized for using relatively long cartridges, (as $b$, Fig. 33), and the secondary arm (Fig. 6) is organized for using short cartridges, (as $o$, Fig. 33), therefore in combining the two arms, (Fig. 3), a short stroke breech action is substituted for a long stroke breech action, with the result of bringing the sear-device of the secondary mechanism in proper position for direct coaction with the trigger-sear device of the primary firearm, so that while the trigger-sear device is in position for coacting in the usual direct manner with the firing-pin of the primary arm, it is also in proper position for coacting in a different manner with the entire breech action of the secondary arm. Thus the trigger-sear device of the primary arm is brought into a combination with the sear-device of the secondary arm, thereby producing for use in the combined arms (Fig. 3) a compound trigger-sear mechanism which comprises two sear-devices, of which one is appurtenant to the primary, and the other to the secondary, arm.

For supplying the cartridges to the chamber 6ᶠ, any suitable and well-known magazine may be employed, but I prefer to use for such purpose an ordinary straight-tube holder, as N; in Figs. 4, 6, this form of magazine is shown provided with the wings, or ribs, 14, 14′, which enter grooves 15, 15′, formed in the projections 6ᵗ, 6ᵗ′, respectively, of the frame F. Said projections are shown of a size and form which permits them to pass through the usual space 3ᶠ (Figs. 2ᵃ, 2ᵇ, 4, 7), of the frame C of the "Springfield" bolt gun, when the frame F is being withdrawn from said frame C.

The secondary frame F has a locking face 6ʸ, (Fig. 3ᵃ), with which the usual bolt-stop $b^2$ of the primary arm, will engage when turned to the position shown in Fig. 2ᵃ, and thus operate as a frame-lock; on turning this bolt-stop to the bolt-releasing position, Fig. 2ᵇ, the reduced side of this stop is then in position to permit the frame F to be withdrawn rearwardly by a sliding movement. This operation of releasing and withdrawing the secondary firearm mechanism may be accomplished with extreme celerity; prior to releasing the stop or lock $b^2$, of course the magazine N, if then in place, should be removed. Thus the same lock, or stop, as $b^2$, used in the primary arm to limit the rearward stroke of the bolt-mechanism D, is also employed in the combined arm for the different purpose of holding the auxiliary (secondary) frame F from having any rearward movement.

In the breech-loading bolt-gun commonly known as the "Springfield rifle,"—herein referred to and briefly described,—the frame C thereof is provided with,—or has formed therein,—the usual chamber-like space which extends rearwardly from the barrel, and which I have designated the breeching-member-chamber; in this chamber of "the primary arm," the bolt D, (which is the operable breeching-member normally appurtenant thereto), is fitted to slide and to partially rotate in the usual well-known manner; on the removal of the said breeching-member D, the frame F of the secondary or auxiliary arm may be slid into and be removably fixed in said chamber, but while in use, this frame has no sliding movement, nor does it have any rotative movement at any time while assembled in the combined firearm. Thus, as will now be evident, the breeching-member, or "bolt,"— as D,—of the primary arm, and the frame, —as F,—of the auxiliary arm or mechanism, are two elements of combination which are exchangeable each for the other, and are adapted each for use in the absence of the other, in connection with an element properly describable as a primary arm which consists of a breech-loading bolt-gun having a breeching-member-chamber and from which the operable breeching-member normally appurtenant thereto has been removed. Because of said exchangeability, the frame F is said to be of a "bolt-form," since this frame can replace the bolt of the primary arm, and therefore to this extent is of similar form.

By means of the described mode of combining the primary and secondary arms, the latter may have such a small and short barrel that when the secondary arm is withdrawn, it may be carried by the soldier in a small case slung from his belt; in this case, the regular bolt of the primary arm may also be carried (but preferably in a separate compartment), while the secondary arm is in use. In the same case, or container, room may also be provided for a suitable number of duplicate magazines charged with cartridges; or, if desired, these may be carried in a separate pouch or container. These magazines are preferably straight, and should be made of a light-weight material, in order to economize room and weight and thus enable the soldier to carry,—at one time, and in case of necessity,—at least two or three hundred cartridges of the short range kind, in addition to his allotment of long range ammunition. Thus the soldier is given the power of instant selection as between a manually operated arm for relatively slow long range firing and an autoloading arm for rapid short range firing, as circumstances may require.

The mode herein set forth of employing a secondary arm as a member substitutable, —bodily, or as a whole,—for the regular bolt-member of the primary arm, has the further and important advantage of providing a long barrel for the short-range projectile. By this means, also, the powder gases are given a much longer time than usual, for driving forward the projectile, thereby increasing to the maximum practicable limit or extent, the effective action of such gas pressure.

Furthermore, the sights of the primary arm being carried on the long barrel, as B, are therefore best arranged for use in aiming while using the relatively short secondary firearm mechanism, so that cartridges of a kind ordinarily used only in military pistols, (or in others of like heavy construction), may now be used with equal rapidity over a longer range and with more effective aiming, and with the fire maintained during a longer period of time. A further advantage conducive to the foregoing results, is that the relatively large weight of the primary arm, which thus carries the secondary arm, serves for the latter as a heavy base-member, and by steadying the mechanism while in action, thereby enables the gunner to secure a reliability of aiming not otherwise attainable under the conditions in which such short-range ammunition is generally required.

While my present improvements are particularly adapted for use in firearms having rifled barrels, they may be applied, if desired, to smooth-bore barrels; accordingly in the accompanying drawings, the main barrel B and the auxiliary barrel $6^b$ are each shown without any rifling being indicated therein by the lines of the drawing. It should, however, be understood that when the "primary arm" is a "Springfield" or similar military arm, the barrel B may or will normally have the kind of rifling usually appurtenant to such arms, and that the auxiliary barrel, as $6^b$, may have any well-known kind of rifling (not herein shown) which is in suitable correspondence with that of said main barrel. Also, it should be noted that in some instances, if desired,—especially when the bore of the barrel B is of relatively large size, or larger than the desired diameter of the projectile of cartridge c, (Fig. 33),—the bore 6ᶜ of said barrel 6ᵇ may be smaller than the bore of said barrel B, so that the projectile, after leaving the bore 6ᶜ, will pass freely through said larger bore without contacting therewith; in such instances, however, it will usually be desirable to make the barrel 6ᵇ considerably longer than shown in the drawing, so that when in place it will extend for a moderate distance forwardly from the cartridge chamber of the barrel B, as will now be readily understood without further description.

The improved trigger-and-sear mechanism which includes the parts d and e, constitutes an invention which is in the nature of a mechanical movement, and hence this mechanism is not specifically claimed herein; but those improvements, so far as the same are of my invention, will constitute in part the subject-matter of a separate application to be concurrently pending herewith.

It will be seen from the drawings as herein described, that I have now set forth and disclosed herein, a construction of the auxiliary frame, F, whereby this member,— in addition to the features thereof required in or by the subject-matter defined in the claims of this present application,—is provided with devices and details having a relation to and direct coaction with a bolt-gun-frame, as C, of the particular construction and character herein illustrated; this additional subject-matter, however, (it being regarded as a separate improvement), is not specifically claimed herein, will constitute in part the subject-matter of a separate application to be concurrently pending herewith.

Having thus described my invention, I claim:—

1. A firearm comprising, as one element thereof, a primary arm which consists of a breech-loading bolt-gun having a breeching-member-chamber and from which the operable breeching-member normally appurtenant thereto has been removed, and comprising, in combination and as a second element thereof, a secondary firearm mechanism having a bolt-form frame removably fixed in said breeching-member-chamber of the primary arm, and provided with cartridge-firing and shell-extracting means.

2. A firearm comprising, as one element thereof, a primary arm which consists of a breech-loading bolt-gun having a breeching-member-chamber and from which the operable breeching-member normally appurtenant thereto has been removed, and comprising, in combination and as a second element thereof, an auxiliary firearm mechanism which is removably fixed in said breeching-member-chamber of the primary arm, and which is provided with cartridge-firing and shell-extracting means.

3. A firearm comprising, as one element thereof, a primary arm which consists of a breech-loading bolt-gun having a breeching-member-chamber and from which the operable breeching-member normally appurtenant thereto has been removed, and comprising, in combination and as a second element thereof, an auto-loading auxiliary firearm mechanism which is removably fixed in said breeching-member-chamber of the primary arm.

4. In a firearm, a primary member which consists of a breech-loading bolt-gun having a barrel and a bolt-member-chamber and from which the operable bolt-member thereof has been removed, in combination with a secondary member consisting of a breech-loading firearm mechanism removably fixed in said bolt-member-chamber of said primary member, and provided with cartridge-placing and firing means.

5. In a firearm, a primary member which consists of a breech-loading bolt-gun having a barrel and a bolt-member-chamber and from which the bolt-member thereof has been removed, in combination with a secondary member consisting of a magazine breech-loading firearm mechanism removably fixed in said bolt-member-chamber, and having a cartridge-chamber in alinement with the bore of the barrel of said primary member.

6. An auxiliary firearm mechanism for use in a breech-loading bolt-gun, said mechanism comprising a bolt-form frame substitutable for the bolt-member of the bolt-gun and having in said frame a cartridge chamber and also having extending forwardly from said chamber, a barrel the bore of which forms a rearward extension of the bore of the barrel of the bolt-gun into which the auxiliary mechanism is inserted, and frame-holding means arranged for releasably holding said bolt-form frame in the bolt-gun.

7. An auxiliary firearm mechanism for use in a breech-loading bolt-gun, said mechanism comprising a bolt-form frame substitutable for the bolt-member of the bolt-gun, and having within said frame a cartridge chamber and provided with cartridge operating and shell-ejection devices, and also having a forwardly-extending barrel which constitutes a combined adapter and breeching-member for the barrel of such bolt-gun.

8. An auxiliary firearm mechanism for use in a breech-loading bolt-gun, said mechanism comprising a bolt-form frame substitutable for the bolt-member of the bolt-gun and having in said frame a cartridge chamber and cartridge-placing and shell-ejection devices, and also having a forwardly-extending barrel the bore of which forms a rearward extension of the bore of the barrel of the bolt-gun into which the auxiliary mechanism shall be inserted.

9. An auxiliary firearm mechanism for use in a breech-loading bolt-gun having a barrel and rearwardly thereof having a breeching-member-chamber, said auxiliary mechanism comprising a frame removably insertible in said breeching-member-chamber, and also having in said frame cartridge placing and firing devices, and also having a forwardly-extending auxiliary barrel with the bore thereof forming a rearward extension of the bore of the barrel of the bolt-gun when the auxiliary mechanism is inserted in said breeching-member-chamber.

10. An auxiliary firearm mechanism for use in a breech-loading bolt-gun having in the barrel thereof a cartridge-chamber for a relatively long cartridge, said auxiliary mechanism comprising a frame having therein a cartridge chamber for a relatively short cartridge, and having cartridge-placing and firing devices, and also having a forwardly-extending auxiliary barrel fitting within said cartridge-chamber of the bolt-gun barrel, the bore of the auxiliary barrel forming a rearward extension of the bore of the barrel of the bolt-gun into which the auxiliary mechanism is inserted, and means including a sear for controlling the operation of the cartridge-placing and firing devices.

11. An auxiliary firearm mechanism for use in a breech-loading bolt-gun having a barrel and rearwardly thereof having a breeching-member-chamber, said auxiliary mechanism comprising a frame having therein a mechanism chamber and removably insertible in said breeching-member-chamber, cartridge-operating devices arranged within said frame, and a sear and a trigger in position and connected for controlling the operation of said cartridge-operating devices.

12. An auxiliary firearm mechanism for use in a breech-loading bolt-gun having a barrel and rearwardly thereof having a breeching-member-chamber, said auxiliary mechanism comprising a frame having therein a mechanism chamber and removably insertible in said breeching-member-chamber, a cartridge-retractable bolt slidably supported within the mechanism chamber of said frame and having a sear-engaging face, a sear in position for engaging said face of the retractable bolt, and a trigger in position and connected for retracting the sear to release the bolt.

13. An auxiliary firearm mechanism for use in a breech-loading bolt-gun having a barrel and rearwardly thereof having a breeching-member-chamber, said auxiliary mechanism comprising an auxiliary frame having a mechanism chamber and removably insertible in said breeching-member-chamber, cartridge placing, firing and extracting devices arranged within said mechanism chamber of the frame, and a sear in position and connected for controlling the operation of said cartridge placing and firing devices.

14. A firearm comprising, in combination, a primary arm which consists of a breech-loading bolt-gun having a barrel and rearwardly thereof having a breeching-member-chamber, an auxiliary frame removably fixed in a working position in said breeching-member-chamber of said primary arm, auto-loading devices operably arranged within said frame, a sear appurtenant to the auxiliary frame and arranged for controlling the operation of the auto-loading devices, and a trigger appurtenant to the bolt-gun and in position and connected for controlling the operation of said sear when the auxiliary frame is in working position in the bolt-gun.

15. The herein described combined primary and secondary firearm, it comprising the bolt-receiving frame, the barrel and the trigger-sear-device of a breech-loading bolt-gun, in combination with an auto-loading secondary arm removably inserted in said frame and having, when so inserted, a fire-control means in position for engaging, and for operation by the trigger-sear-device of said bolt-gun.

16. A combined primary and secondary firearm comprising the bolt-receiving frame, the barrel having therein a cartridge chamber, and the trigger-sear-device operably supported in said frame, and an auto-loading secondary arm insertible in the frame and releasably supported therein, and having, when so inserted, a rearward extension for said barrel, the bore of said extension corresponding with the bore of said barrel, and also having fire-control means in position and arranged for operation from said trigger-sear-device of the primary arm.

17. An auxiliary firearm mechanism for use in a breech-loading bolt-gun having a barrel and rearwardly thereof having a breeching-member-chamber, said auxiliary mechanism comprising an auxiliary frame having therein a mechanism chamber and removably insertible in said breeching-member-chamber when the bolt-member of the bolt-gun is removed therefrom, and also having therein a cartridge-chamber communicating with the bore of the barrel of the bolt-gun when the auxiliary mechanism is inserted in such breeching-member-chamber, cartridge-operating and shell-extracting devices arranged within said auxiliary frame, and fire-control means in position and connected whereby to control the operation of said cartridge-operating devices from the trigger of a bolt-gun.

18. A firearm comprising, as one element thereof, a primary arm which consists of a breech-loading bolt-gun having a breeching-member-chamber and having normally appurtenant thereto a breeching-member retractable rearwardly from the breeching position thereof, and comprising, in combination and as a second element thereof, a secondary firearm mechanism having a chambered frame removably fixed in said breeching-member-chamber of the primary arm, and provided with cartridge-firing and shell-extracting means.

19. A firearm comprising, as one element thereof, a primary arm which consists of a breech-loading bolt-gun having a breeching-member-chamber and having normally appurtenant thereto a breeching-member retractable rearwardly from the breeching position thereof, and comprising, in combination and as a second element thereof, an auxiliary firearm mechanism which is removably fixed in said breeching-member-chamber of the primary arm, and which is provided with cartridge-placing and firing means and with shell-extracting means.

20. A firearm comprising, as one element thereof, a primary arm which consists of a breech-loading bolt-gun having a breeching-member-chamber and having normally appurtenant thereto a breeching-member retractable rearwardly from the breeching position thereof, and comprising, in combination and as a second element thereof, an auto-loading auxiliary firearm mechanism which is removably fixed in said breeching-member-chamber of the primary arm.

21. A firearm comprising a primary arm which consists of a breech-loading bolt-gun having a breeching-member-chamber and a removable breeching-member therefor, in combination with an auxiliary frame removably insertible in a working position in said breeching-member-chamber of said primary arm, cartridge-placing and firing devices operably arranged in said frame, a sear appurtenant to the auxiliary frame and arranged for controlling the operation of said placing and firing devices, a sear-lock appurtenant to the auxiliary frame and coöperative with the sear, and a trigger appurtenant to the bolt-gun and in position and connected for controlling the operation of said sear and the sear-lock when the auxiliary frame is in working position in the bolt-gun.

22. A firearm comprising a primary arm which consists of a breech-loading bolt-gun having a breeching-member-chamber and a removable breeching-member therefor, in combination with an auxiliary frame removably insertible in a working position in said breeching-member-chamber of said primary arm, auto-loading devices arranged in said frame, a sear appurtenant to the auxiliary frame and arranged for controlling the operation of the auto-loading devices, a sear-lock appurtenant to the auxiliary frame and coöperative with the sear, and a trigger appurtenant to the bolt-gun and in position and connected for controlling the operation of said sear and the sear-lock when the auxiliary frame is in working position in the bolt-gun.

23. An auxiliary firearm mechanism for use in a breech-loading bolt-gun having a barrel and rearwardly thereof having a breeching-member-chamber, said auxiliary mechanism comprising a bolt-form frame having therein a mechanism chamber and removably insertible in said breeching-member-chamber when the bolt-member of the bolt-gun is removed therefrom, and also having a forwardly-extending barrel with the bore thereof forming a rearward extension of the bore of the barrel of the bolt-gun when the auxiliary mechanism is inserted in such breeching-member-chamber, cartridge-operating devices arranged within said mechanism chamber of the auxiliary frame, and a sear and controlling means therefor in position and connected whereby to control the operation of said cartridge-operating devices from the trigger of a bolt-gun.

24. An auxiliary firearm mechanism for use in a breech-loading bolt-gun having a barrel and rearwardly thereof having a breeching-member-chamber, said auxiliary mechanism comprising a bolt-form frame having therein a mechanism chamber and removably insertible in said breeching-member-chamber when the bolt-member of the bolt-gun is removed therefrom, and also having a barrel with the bore thereof forming a rearward extension of the bore of the barrel of the bolt-gun when the auxiliary mechanism is inserted in said breeching-member-chamber, cartridge-operating devices arranged within said mechanism-chamber and comprising a reciprocatable bolt, and a sear appurtenant to said frame and in position and connected whereby to control the operation of said reciprocatable bolt from the trigger of the bolt-gun.

JOHN D. PEDERSEN.

Witnesses:
H. D. PENNEY,
LOUIS C. BADEAU.